US012252111B2

(12) United States Patent
Noma et al.

(10) Patent No.: US 12,252,111 B2
(45) Date of Patent: Mar. 18, 2025

(54) VEHICLE CONTROL DEVICE, VEHICLE CONTROL METHOD, AND VEHICLE CONTROL SYSTEM

(71) Applicant: Hitachi Astemo, Ltd., Hitachinaka (JP)

(72) Inventors: Daisuke Noma, Hitachinaka (JP); Kentaro Ueno, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 236 days.

(21) Appl. No.: 17/641,562

(22) PCT Filed: Nov. 24, 2020

(86) PCT No.: PCT/JP2020/043672
§ 371 (c)(1),
(2) Date: Mar. 9, 2022

(87) PCT Pub. No.: WO2021/106873
PCT Pub. Date: Jun. 3, 2021

(65) Prior Publication Data
US 2022/0332306 A1 Oct. 20, 2022

(30) Foreign Application Priority Data
Nov. 28, 2019 (JP) .................... 2019-215350

(51) Int. Cl.
B60W 30/02 (2012.01)
B60G 17/0165 (2006.01)
(Continued)

(52) U.S. Cl.
CPC ......... B60W 30/02 (2013.01); B60G 17/0165 (2013.01); B60W 10/04 (2013.01);
(Continued)

(58) Field of Classification Search
CPC ...... B60W 30/02; B60W 10/04; B60W 10/18; B60W 10/20; B60W 10/22;
(Continued)

(56) References Cited

U.S. PATENT DOCUMENTS 5,938,707 A    8/1999  Uehara
2002/0055810 A1*  5/2002  Nakasako ............. B60W 10/06
                                                     903/917

(Continued)

FOREIGN PATENT DOCUMENTS

DE    10 2012 004 201 A     10/2012
DE       102012004201 A1 *  10/2012  ........... B60G 17/016

(Continued)

OTHER PUBLICATIONS

International Search Report (PCT/ISA/210) issued in PCT Application No. PCT/JP2020/043672 dated Dec. 28, 2020 with English translation (six (6) pages).

(Continued)

*Primary Examiner* — Adam D Tissot
*Assistant Examiner* — Jean W Charleston
(74) *Attorney, Agent, or Firm* — Crowell & Moring LLP

(57) ABSTRACT

The vehicle control device of the present invention acquires characteristics of a road condition in front of a traveling vehicle based on external information; acquires vehicle behavior control variables for controlling the behavior of the vehicle based on estimated state variables of the vehicle that are obtained based on the characteristics, and control variables concerning speed of the vehicle based on the external information; acquires trajectory tracking control variables for causing the vehicle to track the target trajectory based on the target trajectory on which the vehicle travels that are obtained based on the characteristics and the estimated state variables; and outputs the control commands for controlling (Continued)

the suspension device, steering device, and braking and driving device based on the vehicle behavior control variables and the trajectory tracking control variables. This improves travel stability of the vehicle on a road surface on which an irregularity such as ruts exists.

3 Claims, 15 Drawing Sheets

(51) Int. Cl.
- *B60W 10/04* (2006.01)
- *B60W 10/18* (2012.01)
- *B60W 10/20* (2006.01)
- *B60W 10/22* (2006.01)

(52) U.S. Cl.
CPC ............ *B60W 10/18* (2013.01); *B60W 10/20* (2013.01); *B60W 10/22* (2013.01); *B60G 2500/10* (2013.01); *B60G 2500/30* (2013.01); *B60W 2520/10* (2013.01); *B60W 2520/14* (2013.01); *B60W 2530/16* (2013.01); *B60W 2552/30* (2020.02); *B60W 2552/35* (2020.02); *B60W 2555/20* (2020.02); *B60W 2710/18* (2013.01); *B60W 2710/20* (2013.01); *B60W 2710/22* (2013.01); *B60W 2720/106* (2013.01); *B60W 2720/14* (2013.01)

(58) Field of Classification Search
CPC ......... B60W 2520/10; B60W 2520/14; B60W 2530/16; B60W 2552/30; B60W 2552/35; B60W 2555/20; B60W 2710/18; B60W 2710/20; B60W 2710/22; B60W 2720/106; B60W 2720/14; B60W 10/00; B60W 2420/42; B60W 2556/50; B60W 2710/207; B60W 2720/10; B60W 30/10; B60G 17/0165; B60G 2500/10; B60G 2500/30; B60G 2200/4622; B60G 2400/204; B60G 2400/821; B60G 2400/824; B60G 2401/142; B60G 2401/16; B60G 2800/012; B60G 2800/014; B60G 2800/016; B60G 17/0195; B60G 17/015; B60T 7/22; B60T 2260/02; B60T 2260/06; B60T 8/17557; B62D 15/0265; B62D 6/007; B62D 6/04; B62D 15/025; B62D 17/00; F02D 29/02
USPC .......................................................... 701/26
See application file for complete search history.

(56) References Cited

U.S. PATENT DOCUMENTS

| | | | |
|---|---|---|---|
| 2008/0294321 A1* | 11/2008 | Yamakado | B60W 10/06 701/93 |
| 2009/0069993 A1 | 3/2009 | Inoue et al. | |
| 2011/0153116 A1* | 6/2011 | Bedingfield, Sr. | G08G 1/096725 701/1 |
| 2012/0283912 A1* | 11/2012 | Lee | B62D 1/286 701/41 |
| 2013/0013163 A1* | 1/2013 | Hong | B60W 40/06 701/96 |
| 2013/0325255 A1* | 12/2013 | James | B60W 50/082 701/34.4 |
| 2014/0316668 A1* | 10/2014 | Akiyama | B60W 10/20 701/70 |
| 2016/0152232 A1* | 6/2016 | Takahashi | B60T 8/17 701/41 |
| 2016/0272243 A1 | 9/2016 | Matsuno et al. | |
| 2016/0375901 A1* | 12/2016 | Di Cairano | B60W 30/09 701/26 |
| 2018/0086340 A1* | 3/2018 | Nagatsuka | B60W 10/18 |
| 2019/0071079 A1* | 3/2019 | Nishiguchi | B60W 10/20 |
| 2019/0084564 A1* | 3/2019 | Miura | B60W 40/06 |
| 2019/0359023 A1* | 11/2019 | Isshiki | B60G 17/018 |
| 2019/0359219 A1* | 11/2019 | Isshiki | B60W 40/06 |
| 2020/0377083 A1 | 12/2020 | Kokaki et al. | |

FOREIGN PATENT DOCUMENTS

| | | | |
|---|---|---|---|
| DE | 102014013585 A1 * | 3/2016 | ......... B60G 17/0195 |
| DE | 10 2017 001 288 A1 | 8/2017 | |
| DE | 102017201613 A1 * | 8/2018 | |
| JP | 9-62346 A | 3/1997 | |
| JP | 2003-146042 A | 5/2003 | |
| JP | 2008-6995 A | 1/2008 | |
| JP | 2009-61945 A | 3/2009 | |
| JP | 2011-136627 A | 7/2011 | |
| JP | 2014-184747 A | 10/2014 | |
| JP | 2016-172500 A | 9/2016 | |
| JP | 2019-182188 A | 10/2019 | |
| WO | WO 2018/179359 A1 | 11/2019 | |

OTHER PUBLICATIONS

Japanese-language Written Opinion (PCT/ISA/237) issued in PCT Application No. PCT/JP2020/043672 dated Dec. 28, 2020 (five (5) pages).

International Preliminary Report on Patentability (PCT/IB/338) issued in PCT Application No. PCT/JP2020/043672 dated Jun. 9, 2022, including English translation of document C2 (Japanese-language Written Opinion (PCT/ISA/237) filed on Mar. 9, 2022) (seven (7) pages).

Extended European Search Report issued in European Application No. 20891799.7 dated Nov. 25, 2022 (eight (8) pages).

* cited by examiner

FIG.2
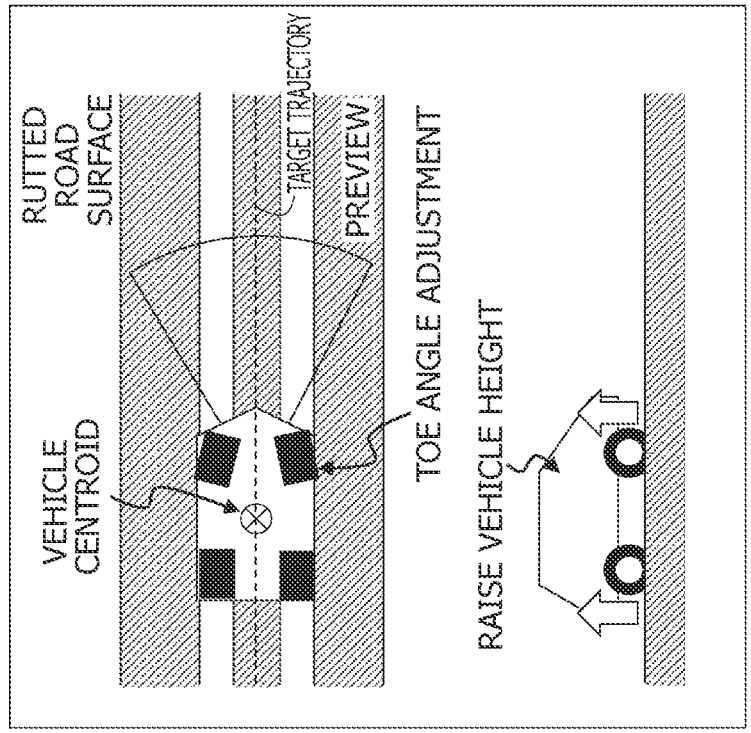
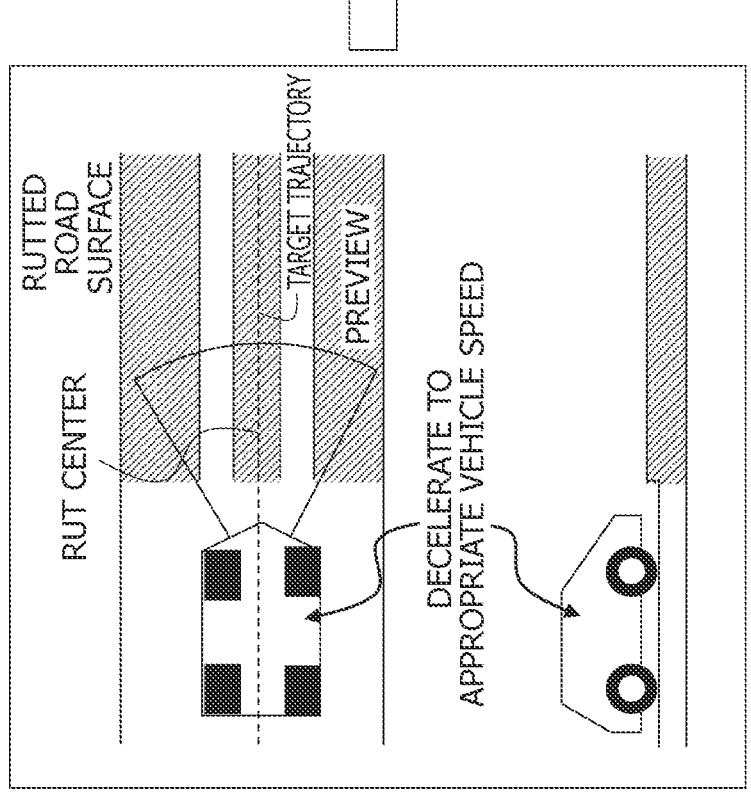

VEHICLE CONTROL DEVICE, VEHICLE CONTROL METHOD, AND VEHICLE CONTROL SYSTEM

TECHNICAL FIELD

The present invention relates to a vehicle control device, a vehicle control method, and a vehicle control system.

BACKGROUND ART

A travel control apparatus of Patent Document 1 sets a target course over a road surface on which a vehicle travels as a first course on the basis of map information, sets target courses over the road surface on which the vehicle travels as second and third courses on the basis of rut information, compares the first course with the second and third courses, and sets the target course over the road surface on which the vehicle travels on the basis of traveling road information and the rut information.

REFERENCE DOCUMENT LIST

Patent Document

Patent Document 1: JP 2016-172500 A

SUMMARY OF THE INVENTION

Problem to be Solved by the Invention

If an irregularity such as ruts on a road surface exists, simply selecting a target course (target trajectory) and controlling a steering angle to trace the selected target course is insufficient to deal with effects of irregularities, and it is difficult to ensure travel stability of vehicles.

The present invention has been made in view of conventional circumstances, and an object of the present invention is to provide a vehicle control device, a vehicle control method, and a vehicle control system that are capable of improving travel stability of a vehicle on a road surface on which irregularities such as ruts exist.

Means for Solving the Problem

According to one aspect of the present invention, characteristics of a road condition in front of a traveling vehicle are acquired based on external information that is acquired from an external recognition unit; vehicle behavior control variables for controlling the behavior of the vehicle are acquired based on estimated state variables of the vehicle that are obtained based on the characteristics of the road condition and control variables concerning speed of the vehicle based on the external information; trajectory tracking control variables for causing the vehicle to track the target trajectory are acquired based on the target trajectory on which the vehicle travels that are obtained based on the characteristics of the road condition and the estimated state variables; and a first control command for controlling the suspension device, a second control command for controlling the steering device, and a third control command for controlling a braking and driving device are output based on vehicle behavior control variables and trajectory tracking control variables.

Effects of the Invention

According to the present invention, it is possible to improve travel stability of a vehicle on a road surface on which irregularities such as ruts exist.

BRIEF DESCRIPTION OF THE DRAWINGS

FIG. 2 is a diagram illustrating deceleration control, vehicle height control, and toe-in control when a vehicle travels in ruts.

MODE FOR CARRYING OUT THE INVENTION

Hereinafter, an embodiment of a vehicle control device, a vehicle control method, and a vehicle control system according to the present invention will be described with reference to the drawings.

Figure 1:
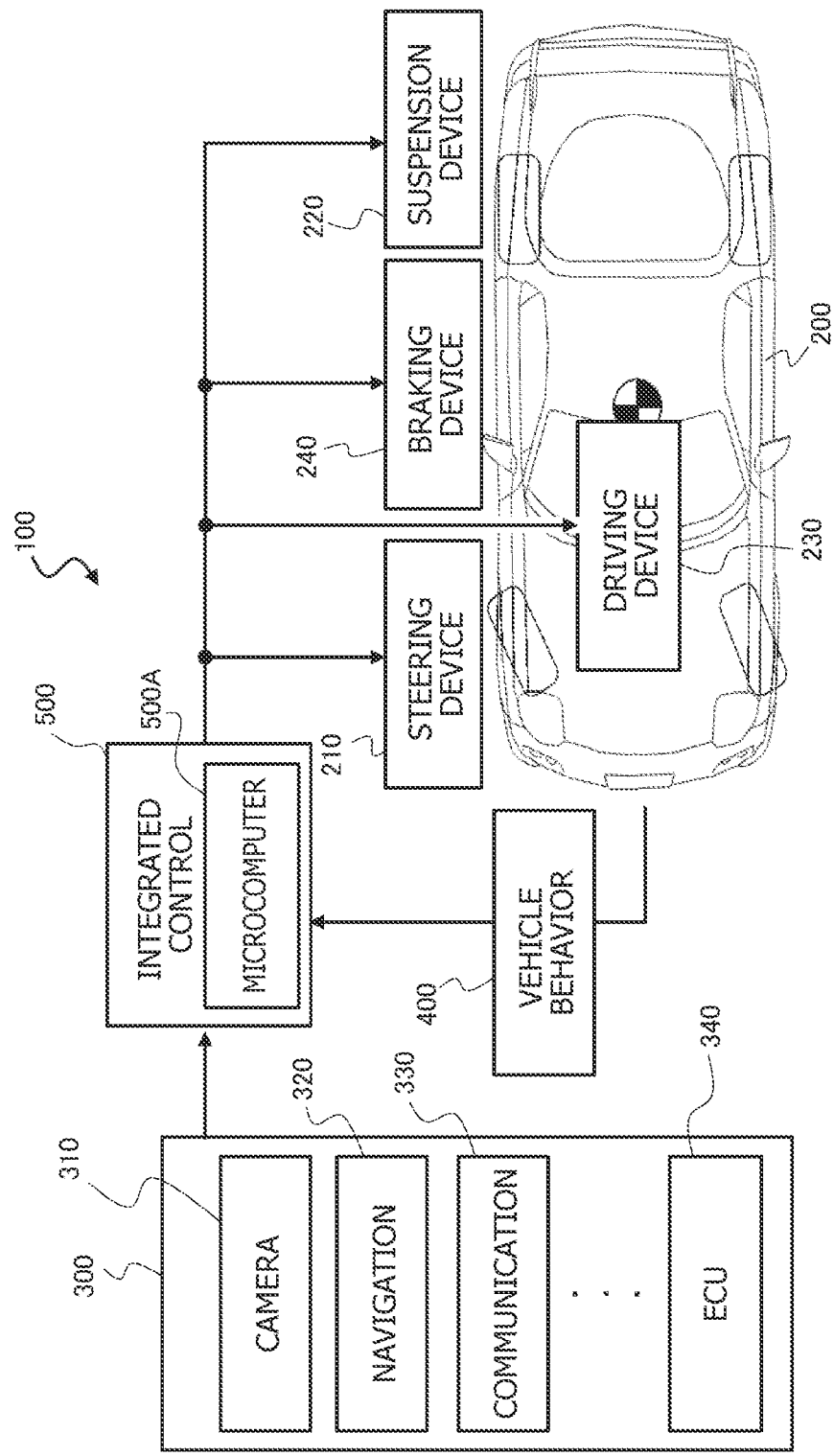
FIG. 1 is a schematic diagram of a vehicle control system.

FIG. 1 is a schematic block diagram illustrating an aspect of a vehicle control system 100.

A vehicle 200 of FIG. 1 is capable of autonomous driving, and it has a steering device 210, a suspension device 220, a driving device 230, and a braking device 240.

Steering device 210 is capable of electronically controlling the steering angle by the steering actuator such as electric power steering (i.e., mechanical steering) and a steer-by-wire system.

Suspension device 220 is capable of electronically controlling the vehicle height and damping force by the energy source such as hydraulic pressure and pneumatic pressure such as fully active suspension and electronic controlled air suspension.

Driving device 230 is capable of electronically controlling the driving force such as a motor and an engine.

Furthermore, braking device 240 is capable of electronically controlling the braking force such as a friction brake and a regenerative brake.

Driving device 230 and braking device 240 constitute the braking and driving device that is capable of electronically controlling the braking and driving force of vehicle 200.

Furthermore, vehicle control system 100 includes an external recognition unit 300, a vehicle behavior detection unit 400, and an integrated control controller 500 (vehicle control device) as well as steering device 210, suspension device 220, driving device 230, and braking device 240.

External recognition unit 300 includes, for example, a stereo camera 310 that captures images of the surroundings of vehicle 200, a navigation system 320 that uses the Global Positioning System (GPS) and map information in combination, a communication system 330 that acquires the vehicle position, the external information and the like from the outside by means of inter-vehicle communications and the like, and an electronic control unit 340 (AD-ECU, ADAS-ECU) that controls autonomous driving or Advanced Driver Assistance Systems.

Here, external recognition unit 300 may include, for example, Light Detection and Ranging, Laser Imaging Detection and Ranging (LIDAR).

Furthermore, electronic control unit 340 has the function of acquiring the external information (peripheral information) through, for example, analysis of images captured by stereo camera 310.

Integrated control controller 500 is the electronic control device that includes a microcomputer 500A which serves as the control unit that obtains the control commands for controlling steering device 210, suspension device 220, driving device 230, and braking device 240.

Integrated control controller 500 acquires information on a vehicle speed command or an acceleration command, road surface displacements, road shape, surrounding environment and the like from external recognition unit 300, acquires information on vehicle behavior (for example, yaw rate, lateral G, longitudinal G, wheel speed, and the like) from vehicle behavior detection unit 400, and computes acquired information to obtain and output control commands for controlling steering device 210, suspension device 220, driving device 230, and braking device 240, respectively.

Here, as the preview information from stereo camera 310, integrated control controller 500 detects the road condition in front of the vehicle, which may cause disruption of the behavior of vehicle 200, such as road curvature, ruts, drifts, bumps, and potholes.

When integrated control controller 500 detects that irregularity such as ruts exists on the road surface in front of the vehicle, integrated control controller 500 uses steering device 210, suspension device 220, driving device 230 and braking device 240 to control three axes of the vehicle, which are the longitudinal, transverse and vertical axes. In this way, in addition to the trajectory tracking control, integrated control controller 500 performs integral control for ensuring travel stability of vehicle 200 on the road surface where irregularity such as ruts exists.

Here, integrated control controller 500 performs longitudinal axis control by using driving device 230 and braking device 240 to control the braking and driving force, that is, to control the engine torque, motor torque, regenerative braking, and friction braking, performs transverse axis control by using steering device 210 to control the steering angle, and performs vertical axis control by using suspension device 220 to control the vehicle height and damping force.

The ruts, drifts, bumps, and potholes are characteristics of changes in road surface displacements among the characteristics of the road condition, that is, the recognition result concerning the unevenness of the road surface of the road condition (i.e., the identification information concerning the unevenness of the road surface).

Integrated control controller 500 acquires characteristics of the road condition (specifically, information concerning the curvature of the road surface and the change in the road surface displacements) based on the analysis result of the image captured by stereo camera 310.

Hereinafter, the three-axis control that is performed by integrated control controller 500 to ensure travel stability of vehicle 200 when irregularity such as ruts exists on the road surface in front of the vehicle is explained for each road condition (i.e., for each type of irregularity).

FIG. 2 is a diagram illustrating the control details of integrated control controller 500 when vehicle 200 travels on a rutted road surface.

Ruts are tracks of wheels (i.e., grooves or recesses) that remain on a road surface after automobiles have passed, and occur on snow-covered roads and on unpaved roads. The following embodiment explains the case of ruts on a snow-covered road as an example.

When integrated control controller 500 detects ruts in front of vehicle 200 based on preview information from stereo camera 310, integrated control controller 500 decreases the traveling speed of vehicle 200 before vehicle 200 encounters ruts, to a predetermined appropriate vehicle speed that can ensure stability when vehicle 200 travels along the ruts.

As a result, integrated control controller 500 causes vehicle 200 to encounter the ruts at a speed equal to or less than the appropriate vehicle speed.

Here, integrated control controller 500 decelerates vehicle 200 to the appropriate vehicle speed by performing control to reduce the driving force that driving device 230 generates, and/or performing control to increase the braking force that braking device 240 generates.

That is, when integrated control controller 500 detects ruts in front of a vehicle, integrated control controller 500 outputs the deceleration control command (third control command) to driving device 230 and/or braking device 240 so that vehicle speed is reduced compared to before ruts were detected; in other words, reduced vehicle speed compared to when a vehicle travels on a road surface without ruts.

Furthermore, in order to suppress the interference between the vehicle body of vehicle 200 and the snow on the road surface, when vehicle 200 travels in ruts, integrated control controller 500 outputs a control command (first control command) to suspension device 220 to raise the vehicle height so that the vehicle height is raised higher than when vehicle 200 travels on a road surface without ruts.

Furthermore, when steering device 210 is a steer-by-wire system and the toe angle of the front right and left wheels (that is, the front toe) is adjustable, integrated control controller 500 performs toe-in control when vehicle 200 travels in ruts.

That is, when vehicle 200 travels in ruts, integrated control controller 500 performs toe-in control by directing the toe angle of the front wheels more inwardly than when vehicle 200 does not travel in ruts, and thus, improves stability when vehicle 200 travels along ruts.

As described above, when vehicle 200 travels in ruts, integrated control controller 500 performs three-axis control by decelerating the vehicle to the appropriate vehicle speed for traveling in ruts, increasing the vehicle height, and causing the wheels to toe in, and thus ensures stability when vehicle 200 travels in ruts.

Furthermore, when vehicle 200 travels in ruts, integrated control controller 500 outputs the target trajectory control command (second control command) to steering device 210 so that the centroid position of vehicle 200 moves along the center of the ruts, in other words, moves along the ruts while the right and left wheels are caught in the ruts.

Note that the center of the ruts is the center of the space between the right and left ruts (see FIG. 2).

However, if integrated control controller 500 determines that the interference between vehicle 200 and the snow cover may not be sufficiently suppressed even if the control for raising the vehicle height to the maximum is performed due to deep ruts, that is, determines that a predetermined vehicle height that allows traveling in ruts may not be ensured, integrated control controller 500 performs correction processing to offset the target trajectory in autonomous driving by a predetermined distance in the transverse direction from the center of the ruts, and outputs a control command (second control command) concerning steering angle to steering device 210 so that vehicle 200 travels along the corrected target trajectory.

That is, integrated control controller 500 acquires the target trajectory based on characteristics of the irregularity of the road surface state (identification information of ruts) and the characteristics of the road shape (i.e., information concerning road shape), and outputs the control command (second control command) concerning steering to steering device 210 so that vehicle 200 travels along the target trajectory.

Figure 3:
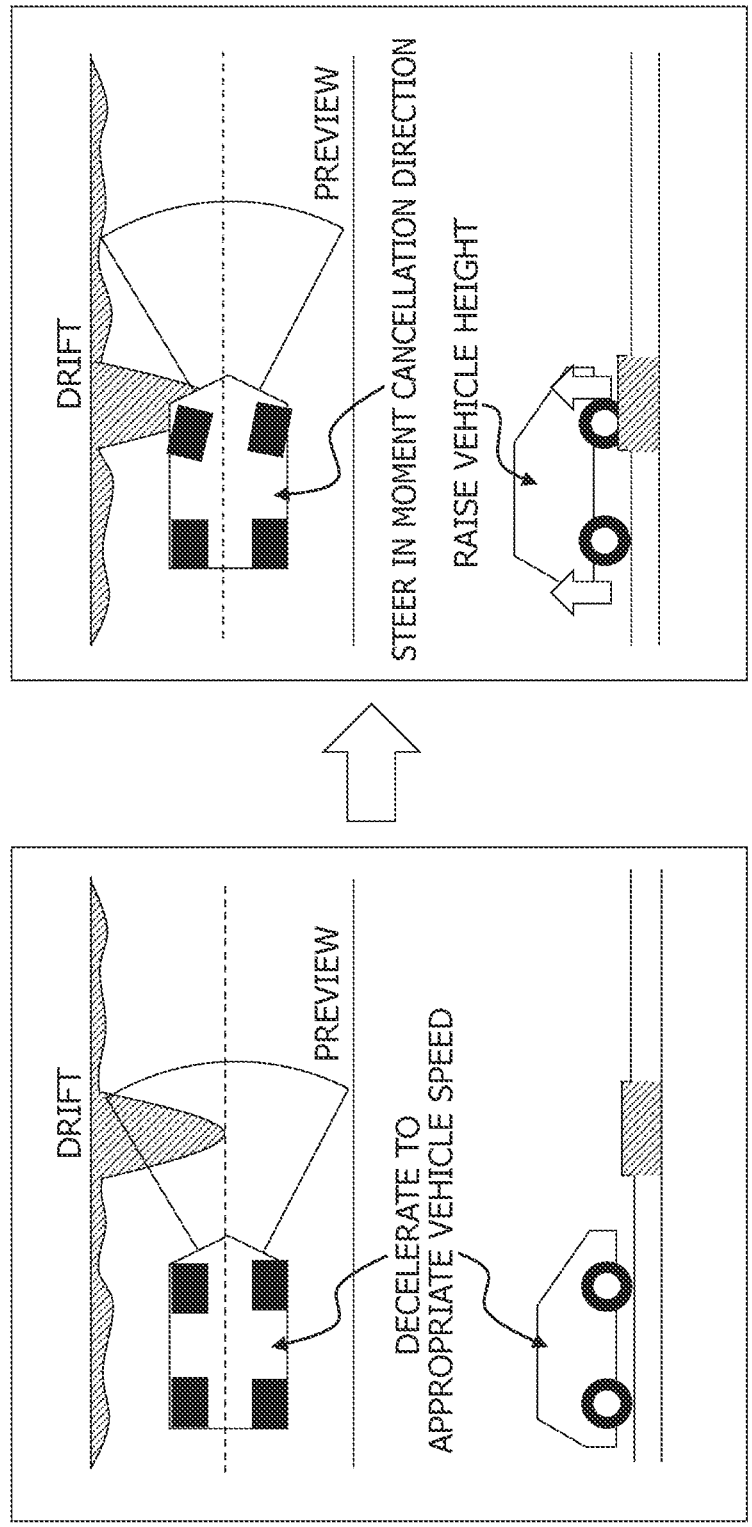
FIG. 3 is a diagram illustrating deceleration control, vehicle height control, and steering control when a vehicle travels over a drift.

FIG. 3 illustrates the control details of integrated control controller 500 when vehicle 200 travels over a drift.

The drift is an area of the road on which snow or fallen leaves have been blown by the wind and deposited, or refers to the deposit (mound). The following embodiment explains the case of a snowdrift as an example.

When integrated control controller 500 detects a snowdrift in front of vehicle 200 based on the preview information from stereo camera 310, integrated control controller 500 decreases the traveling speed of vehicle 200, before vehicle 200 encounters the snowdrift, to a predetermined appropriate vehicle speed that can ensure stability when vehicle 200 travels over the snowdrift.

As a result, integrated control controller 500 causes vehicle 200 to encounter the snowdrift at a speed equal to or less than an appropriate vehicle speed.

Here, integrated control controller 500 decelerates vehicle 200 to an appropriate vehicle speed by performing control to reduce the driving force that driving device 230 generates, and/or performing control to increase the braking force that braking device 240 generates.

That is, when integrated control controller 500 detects a snowdrift in front of the vehicle, integrated control controller 500 outputs the deceleration control command (third control command) to driving device 230 and/or braking device 240 so that the vehicle speed is reduced compared to before the snowdrift was detected, in other words, reduced vehicle speed compared to when the vehicle travels on the road surface without snowdrifts.

Furthermore, in order to suppress the interference between the vehicle body of vehicle 200 and the snowdrift, when vehicle 200 travels over the snowdrift, integrated control controller 500 outputs the control command (first control command) for raising the vehicle height to suspension device 220 so that the vehicle height is raised higher than when vehicle 200 travels on the road surface without snowdrifts.

Here, if either the right wheel or the left wheel of vehicle 200 travels over the snowdrift, the track resistance of either the right wheel or the left wheel becomes greater than that of the other, and a yaw moment is generated in vehicle 200.

Thus, when vehicle 200 travels over a snowdrift, integrated control controller 500 outputs the steering angle control command (second control command) to steering device 210 so that a yaw moment is generated in a direction opposite to another yaw moment that is generated by the track resistance caused by the snowdrift, and thereby offsets the other yaw moment that is generated by the track resistance caused by the snowdrift.

As described above, when vehicle 200 travels over the snowdrift, in other words, when vehicle 200 goes over the snowdrift, integrated control controller 500 performs three-axis control by decelerating the vehicle to an appropriate vehicle speed for traveling over a snowdrift, increasing the vehicle height, and steering the wheels to suppress yaw moment, and thus, ensures stability when vehicle 200 travels over the snowdrift.

Figure 4:
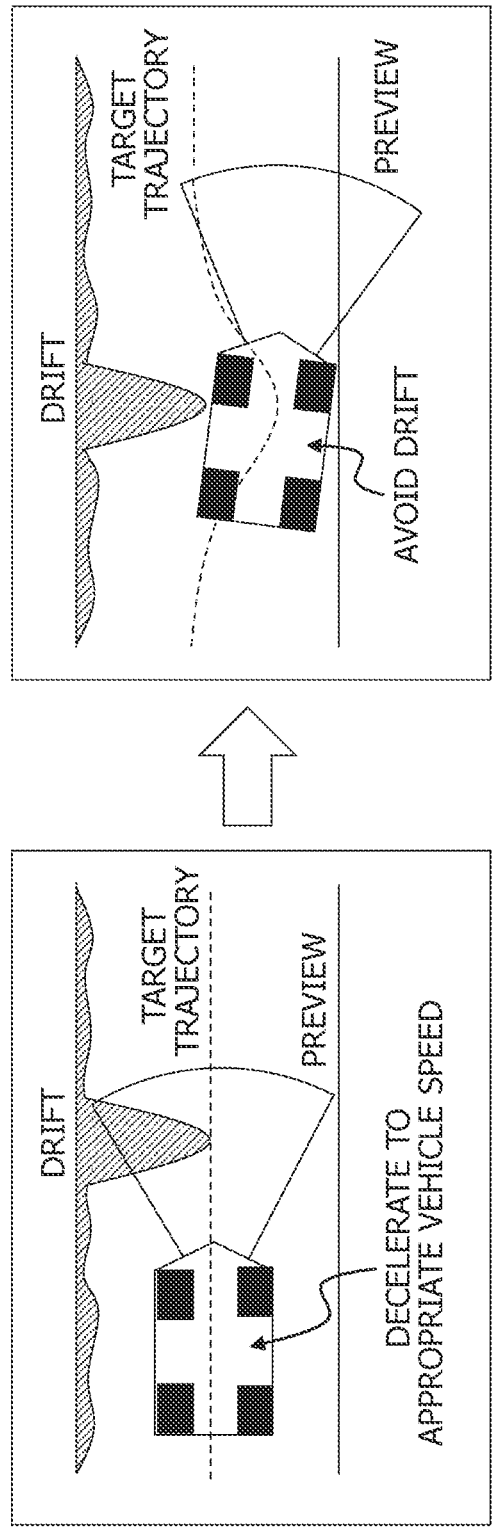
FIG. 4 is a diagram illustrating deceleration control and correction control of a target trajectory when a vehicle travels over a drift.

FIG. 4 illustrates the control of target trajectory for causing vehicle 200 to travel while avoiding the snowdrift.

When integrated control controller 500 detects a snowdrift in front of vehicle 200, if avoidance conditions such as there being no oncoming vehicle is satisfied, integrated control controller 500 corrects the target trajectory to avoid the snowdrift, and allows vehicle 200 to travel along the corrected target trajectory.

That is, integrated control controller 500 acquires the target trajectory based on the characteristics of irregularity of the road surface state (identification information of a snowdrift) and the characteristics of the road shape (i.e., information concerning the road shape), and outputs a control command (second control command) concerning steering to steering device 210 so that vehicle 200 travels along the target trajectory.

Figure 5:
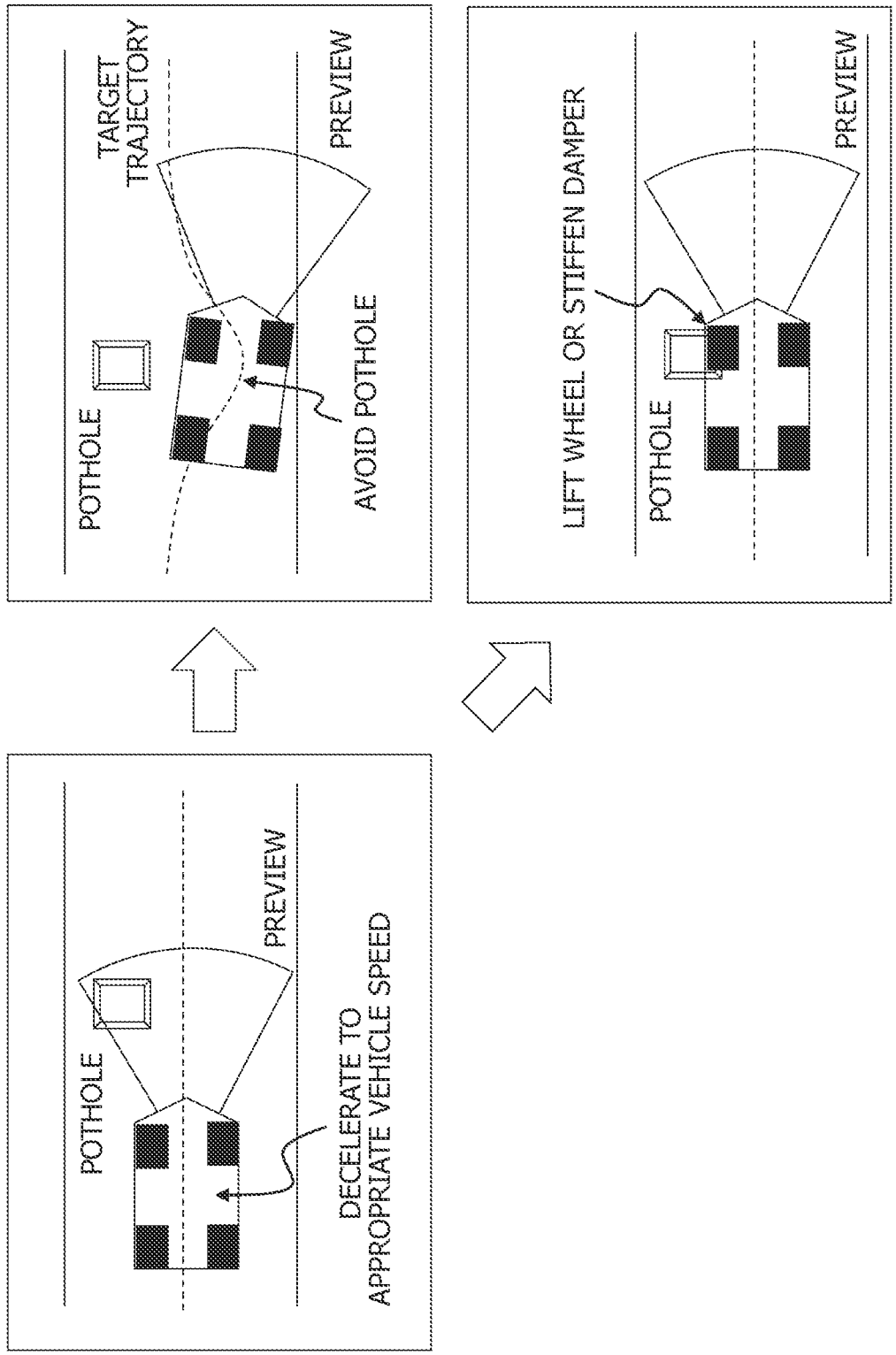
FIG. 5 is a diagram illustrating deceleration control, correction control of the target trajectory, and control of a suspension device when a vehicle travels over a pothole.

FIG. 5 illustrates the control details of integrated control controller 500 when a pothole is detected in front of vehicle 200.

The pothole is a hole (or a recess) having a length of about 0.1 m to 1 m that is formed on a paved road surface (for example, an asphalt pavement).

When integrated control controller 500 detects a pothole in front of vehicle 200 based on the preview information from stereo camera 310, integrated control controller 500 decreases the traveling speed of vehicle 200, before vehicle 200 encounters the pothole, to a predetermined appropriate vehicle speed that can ensure stability when vehicle 200 travels over the pothole.

As a result, integrated control controller 500 causes vehicle 200 to encounter the pothole at a speed equal to or less than an appropriate vehicle speed.

Here, integrated control controller 500 decelerates vehicle 200 to an appropriate vehicle speed by performing control to reduce the driving force that driving device 230 generates, and/or performing control to increase the braking force that braking device 240 generates.

That is, when integrated control controller 500 detects a pothole in front of the vehicle, integrated control controller 500 outputs the deceleration control command (third control command) to driving device 230 and/or braking device 240 so that the vehicle speed is reduced compared to before the pothole was detected; in other words, reduced vehicle speed compared to when the vehicle travels on a road surface without potholes.

Furthermore, integrated control controller 500 outputs the vehicle-height and/or damping-force control command to suspension device 220 in order to prevent the wheels of vehicle 200 from falling in the pothole and impacting the vehicle body.

Here, as for the wheel that is expected to travel over the pothole, integrated control controller 500 outputs a control command (first control command) to suspension device 220 to lift the wheel, and/or outputs a control command (first control command) to suspension device 220 to stiffen the damper (i.e., shock absorber), in other words, to increase damping force, which is the resistance force generated by the damper.

If vehicle 200 can travel on a trajectory that avoids a pothole, integrated control controller 500 may correct the target trajectory to that for avoiding the pothole and output the steering angle control command (second control command) to steering device 210 so that vehicle 200 travels along such target trajectory.

That is, integrated control controller 500 acquires the target trajectory based on the characteristics of the irregularity of the road surface state (specifically, identification information of a pothole) and the characteristics of the road shape (i.e., information concerning road shape), and outputs a control command (second control command) concerning steering to steering device 210 so that vehicle 200 travels along the target trajectory.

Figure 6:
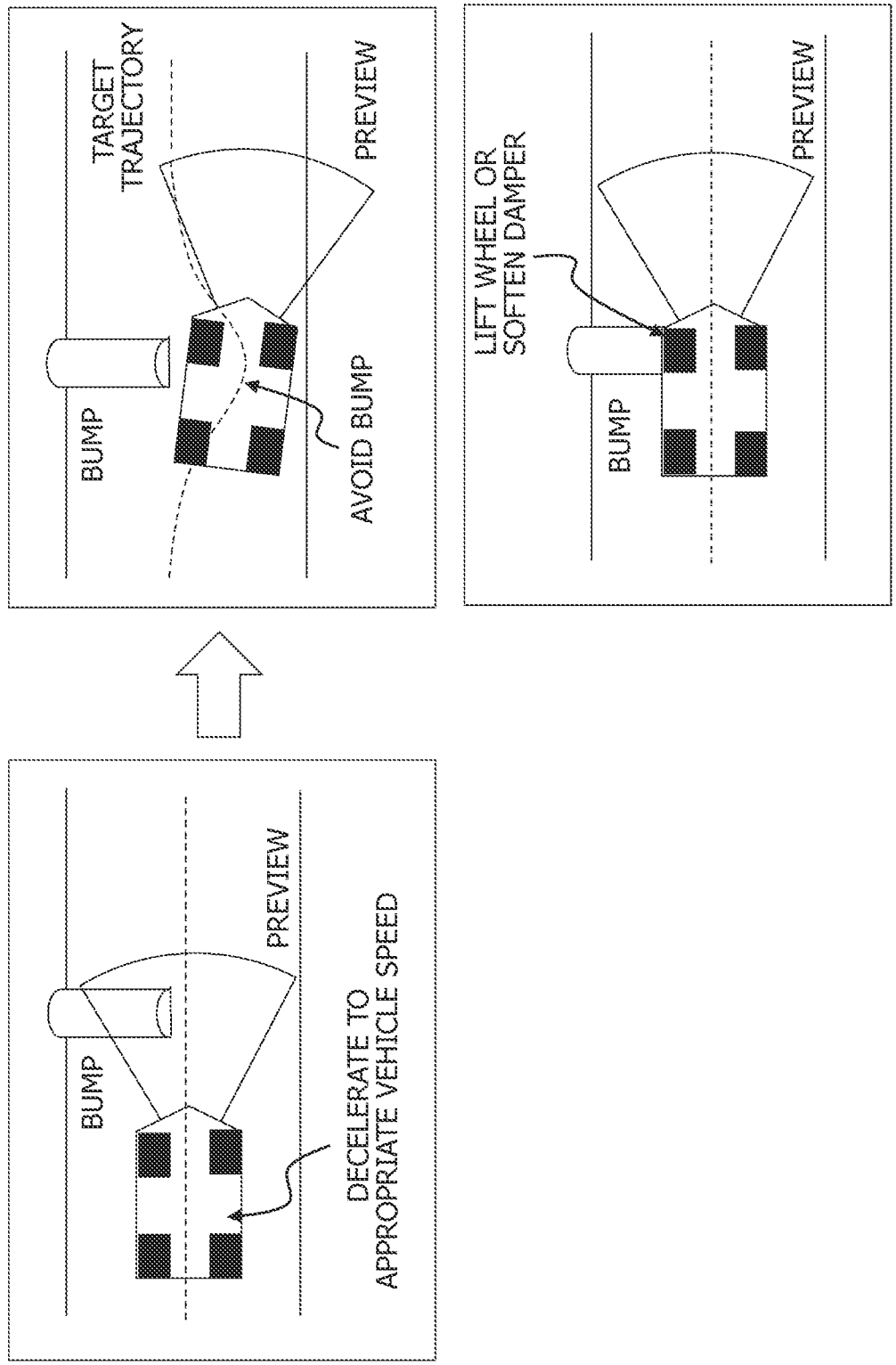
FIG. 6 is a diagram illustrating deceleration control, correction control of the target trajectory, and control of the suspension device when a vehicle travels over a bump.

FIG. 6 illustrates control details of integrated control controller 500 when a bump is detected in front of vehicle 200.

The bump refers to an area in which a part of the road has bumps as a result of construction work or the like, and may exclude bumps that are intentionally installed to encourage drivers to decelerate (for example, a speed bump or a speed cushion).

When integrated control controller 500 detects a bump in front of vehicle 200 based on preview information from stereo camera 310, integrated control controller 500 decreases the traveling speed of vehicle 200, before vehicle 200 encounters the bump, to a predetermined appropriate vehicle speed that can ensure stability when vehicle 200 travels over the bump.

As a result, integrated control controller 500 causes vehicle 200 to encounter the bump at a speed equal to or less than an appropriate vehicle speed.

Here, integrated control controller 500 decelerates vehicle 200 to an appropriate vehicle speed by performing control to reduce the driving force that driving device 230 generates, and/or performing control to increase the braking force that braking device 240 generates.

That is, when integrated control controller 500 detects a bump in front of the vehicle, integrated control controller 500 outputs the deceleration control command (third control command) to driving device 230 and/or braking device 240 so that the vehicle speed is reduced compared to before the bump was detected; in other words, reduced vehicle speed compared to when the vehicle travels on a road surface without bumps.

Furthermore, integrated control controller 500 outputs the vehicle height and/or damping force control command to suspension device 220 in order to suppress the generation of vertical vibration of vehicle 200 when a wheel of vehicle 200 rides up on the bump.

Here, as for the wheel that is expected to ride up on the bump, integrated control controller 500 outputs the control command (first control command) to suspension device 220 to lift the wheel, or outputs the control command (first control command) to suspension device 220 to soften the damper (i.e., the shock absorber), in other words, to reduce the damping force which is the resistance force generated by the damper.

If vehicle 200 can travel on a trajectory that avoids a bump, integrated control controller 500 may correct the target trajectory to that for avoiding the bump and output a control command (second control command) concerning steering angle to steering device 210 so that vehicle 200 travels along such a target trajectory.

That is, integrated control controller 500 acquires a target trajectory based on the characteristics of the irregularity of the road surface state (identification information of a bump) and the characteristics of the road shape (i.e., information concerning road shape), and outputs a control command (second control command) concerning steering to steering device 210 so that vehicle 200 travels along a target trajectory.

Figure 7:
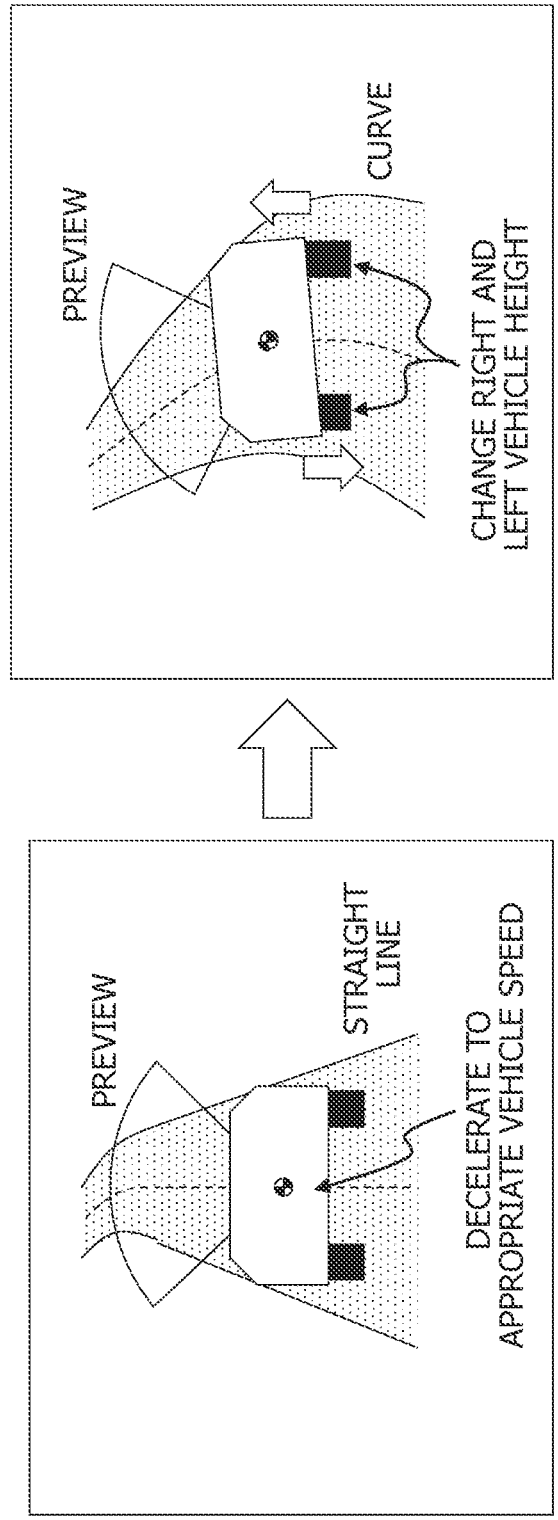
FIG. 7 is a diagram illustrating deceleration control and vehicle height control when a vehicle travels on a curved road.

FIG. 7 illustrates the control details of integrated control controller 500 when a curved road (i.e., a curvature of the road surface) is detected in front of vehicle 200.

When integrated control controller 500 detects the curved road in front of vehicle 200 based on the preview information, map information, and the like, from stereo camera 310, integrated control controller 500 decreases the traveling speed of vehicle 200, before vehicle 200 encounters the curved road, to a predetermined appropriate vehicle speed that can ensure stability when vehicle 200 travels on the curved road.

As a result, integrated control controller 500 causes vehicle 200 to encounter the curved road at a speed equal to or less than an appropriate vehicle speed.

Here, integrated control controller 500 decelerates vehicle 200 to an appropriate vehicle speed by performing control to reduce driving force that driving device 230 generates, and/or performing control to increase braking force that braking device 240 generates.

That is, when integrated control controller 500 detects a curved road in front of the vehicle, integrated control controller 500 outputs a deceleration control command (third control command) to driving device 230 and/or braking device 240 so that the vehicle speed is reduced compared to before the curved road was detected; in other words, reduced vehicle speed compared to when the vehicle travels on a straight road.

Furthermore, integrated control controller 500 suppresses lateral acceleration that is felt by an occupant of vehicle 200 during traveling on a curved road by outputting the vehicle height adjustment control command (first control command) to suspension device 220 so that, for right or left vehicle height of vehicle 200, the vehicle height on the turning inner side becomes lower than the vehicle height on the turning outer side.

For example, integrated control controller 500 performs vehicle height control by reducing the vehicle height on the turning inner side and raising the vehicle height on the turning outer side from the state in which the right and left vehicle heights are controlled to be the same. In this way, the vehicle height on the turning inner side is lower than that on the turning outer side.

Figure 8:
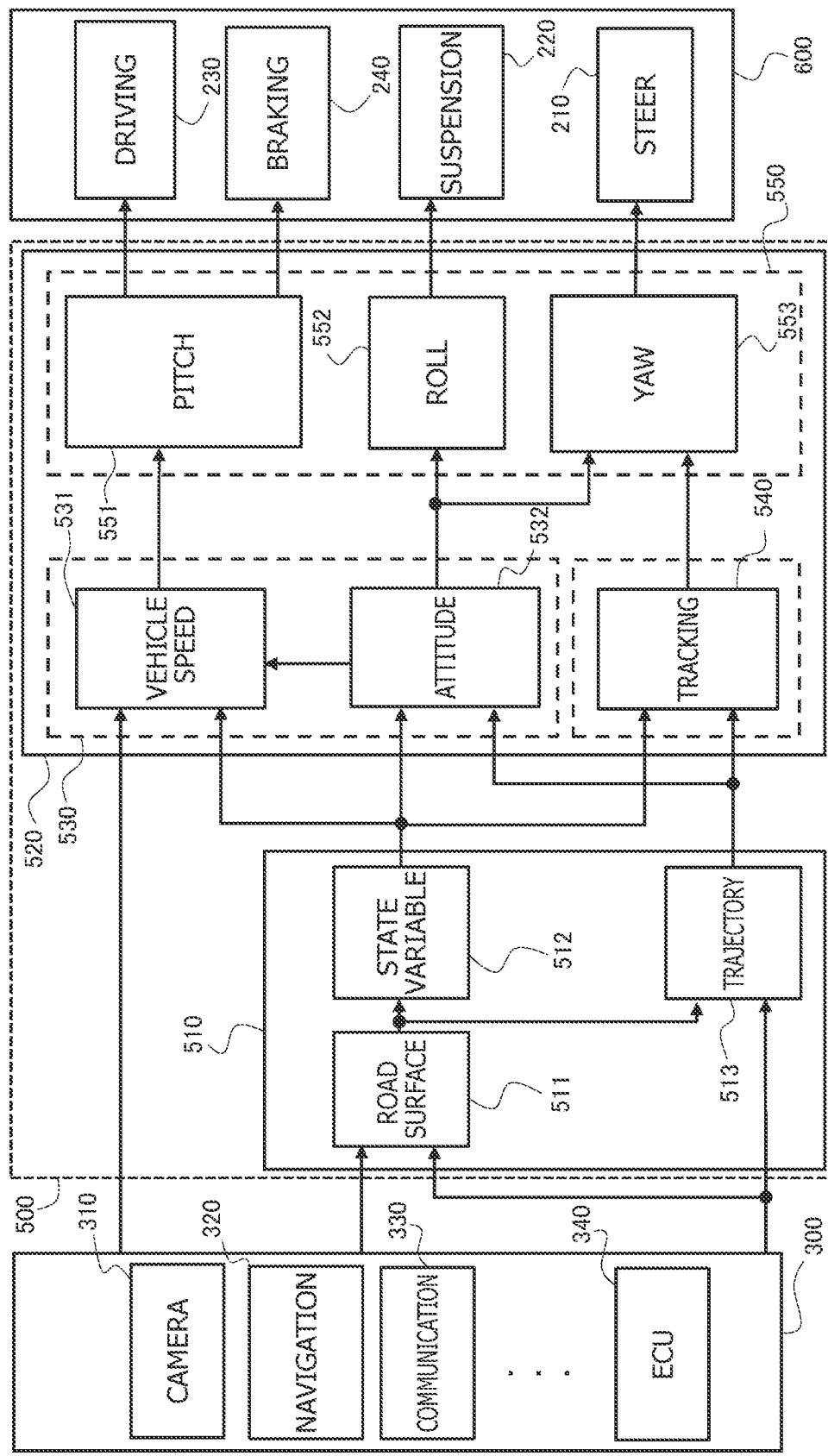
FIG. 8 is a functional block diagram of an integrated control controller.

Hereinafter, the functions of integrated control controller 500, that is, the vehicle behavior control and the trajectory tracking control including the control functions for dealing with the road condition irregularity such as ruts, are explained in detail with reference to the functional block diagram of FIG. 8.

Integrated control controller 500 has a state estimation unit 510 and an integrated control execution unit 520. Furthermore, integrated control execution unit 520 includes a vehicle behavior control unit 530, a trajectory tracking control unit 540, and a distribution control unit 550.

State estimation unit 510 includes a road surface determination unit 511, a vehicle state variable estimation unit 512, and a trajectory generation unit 513.

Road surface determination unit 511 acquires the road surface displacements, road shape, peripheral information and the like from external recognition unit 300, and obtains and outputs characteristics of the road condition including identification information such as ruts, snowdrifts, potholes, and bumps, that is, the irregularity information.

Vehicle state variable estimation unit 512 acquires road condition information and the like that are output by road surface determination unit 511, and estimates the vehicle state variables including the estimated vehicle speed, side-slip angle, vehicle height, the position of the vehicle itself and the like.

Note that the estimated vehicle speed is the data of vehicle speed that is obtained based on information on the wheel speed.

Trajectory generation unit 513 acquires the road shape and peripheral information from external recognition unit 300, and acquires the road condition information including the irregularity information (for example, the identification information such as ruts) from road surface determination unit 511.

Then, trajectory generation unit 513 generates the target trajectory that avoids the irregularity according to conditions such as the state of irregularity such as a snowdrift and the presence or absence of an oncoming vehicle.

Furthermore, when vehicle 200 travels in ruts, trajectory generation unit 513 generates the target trajectory so that the centroid position of vehicle 200 moves along the center of the ruts, and if the determination is made that the vehicle height that enables traveling along the ruts may not be ensured, generates a target trajectory that is offset by a predetermined distance in the transverse direction from the center of the ruts.

That is, road surface determination unit 511 determines the road surface state in front of traveling vehicle 200 based on characteristics of road surface displacements and characteristics of road shape, and trajectory generation unit 513 acquires the target trajectory based on characteristics of the irregularity of the road surface state and characteristics of the road shape.

Vehicle behavior control unit 530 of integrated control execution unit 520 has a vehicle speed control unit 531 and an attitude control unit 532.

Vehicle speed control unit 531 acquires information on a vehicle speed command and an acceleration command in autonomous driving (advanced driver assistance) from external recognition unit 300; in other words, information on control variables concerning the speed of vehicle 200, acquires information on estimated vehicle speed from vehicle state variable estimation unit 512, and acquires information on the target vehicle speed according to irregularity of the road surface from attitude control unit 532.

Then, based on the information on the target vehicle speed according to the irregularity of the road surface and information on the vehicle speed command in autonomous driving, vehicle speed control unit 531 determines the presence or absence of the deceleration request before encountering an irregularity such as ruts, and decides the final target vehicle speed.

Furthermore, vehicle speed control unit 531 obtains target longitudinal acceleration based on the comparison between final target vehicle speed and estimated vehicle speed, and outputs information on the obtained target longitudinal acceleration.

Furthermore, attitude control unit 532 acquires information on the target trajectory from trajectory generation unit 513, acquires information on vehicle state variables including state of entry into an irregularity on the road surface from vehicle state variable estimation unit 512, and based on these, obtains and outputs the target vehicle height, target roll moment, target lateral acceleration, and the like.

That is, when vehicle 200 travels on an irregular portion of a road surface such as ruts and a snowdrift, attitude control unit 532 changes the target vehicle height so that the vehicle height is raised, and sets the target lateral acceleration so that a yaw moment is generated in a direction opposite to another yaw moment that is generated by the track resistance caused by a snowdrift.

Furthermore, attitude control unit 532 outputs the toe-in request when vehicle 200 travels in ruts, outputs a request for adjusting the damping force and/or vehicle height when vehicle 200 travels over a bump or a pothole, and outputs a request for adjusting the right or left vehicle height when vehicle 200 travels on a curved road.

Thus, vehicle behavior control unit 530 constituted by vehicle speed control unit 531 and attitude control unit 532 acquires vehicle behavior control variables based on vehicle state variables that include estimated vehicle speed of vehicle 200, target trajectory, and control variables (specifically, vehicle speed command and acceleration command) concerning the speed of vehicle 200.

Trajectory tracking control unit 540 acquires information on the position of the vehicle itself (vehicle position) from vehicle state variable estimation unit 512 and information on the target trajectory from trajectory generation unit 513, and obtains and outputs information on target lateral acceleration (trajectory tracking control variables) for causing vehicle 200 to trace the target trajectory.

That is, trajectory tracking control unit 540 acquires the trajectory tracking control variables based on the position of vehicle 200 itself of the estimated state variables of vehicle 200, and the target trajectory.

Distribution control unit 550 has a longitudinal and pitch control unit 551, a vertical and roll control unit 552 and a transverse and yaw control unit 553, and outputs the control commands to driving device 230, braking device 240, suspension device 220, and steering device 210 respectively which constitute an actuator control unit 600.

Longitudinal and pitch control unit 551 acquires information on the target longitudinal acceleration from vehicle speed control unit 531, and based on the comparison between the target longitudinal acceleration and the actual longitudinal acceleration, outputs the drive torque control command to driving device 230 as the control command (third control command) for realizing the target longitudinal acceleration, and outputs the braking torque control command to braking device 240.

Vertical and roll control unit 552 acquires information on the target vehicle height, target roll moment, target damping force, and the like, from attitude control unit 532, and based on these, outputs a control command (first control command) to suspension device 220 to adjust the vehicle height and damping force.

Transverse and yaw control unit 553 acquires information on the target lateral acceleration from attitude control unit 532 and trajectory tracking control unit 540, and based on these, outputs a control command (second control command) to steering device 210 to adjust the steering angle.

Thus, distribution control unit 550 outputs the first control command for controlling suspension device 220, the second control command for controlling steering device 210, and the third control command for controlling the braking and driving device (driving device 230 and braking device 240) based on the vehicle behavior control variables from vehicle behavior control unit 530 and the trajectory tracking control variables from trajectory tracking control unit 540.

Figure 9:
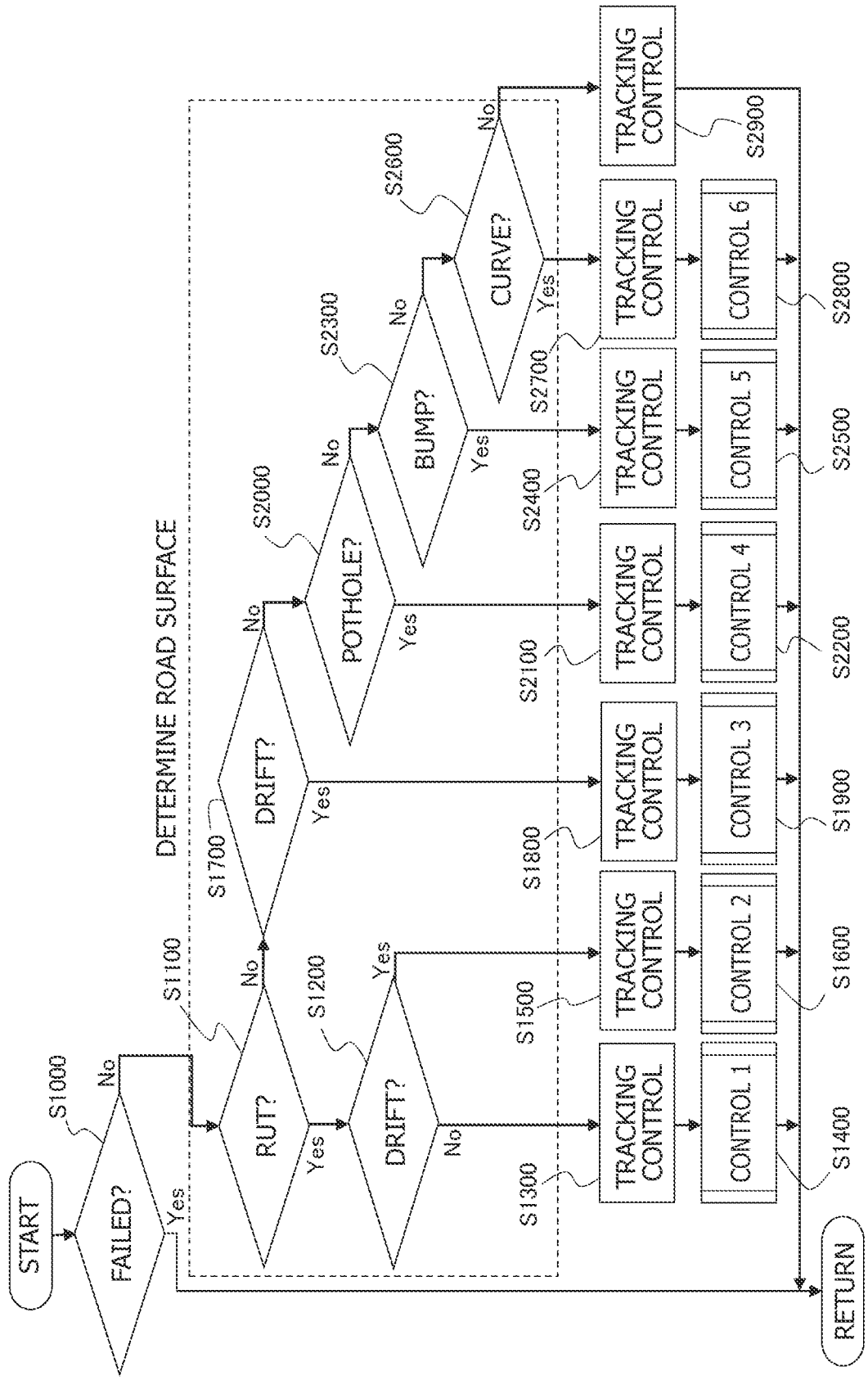
FIG. 9 is a flowchart illustrating control details of the integrated control controller.

FIG. 9 is a flowchart illustrating a procedure for control of steering device 210, suspension device 220, driving device 230, and braking device 240, respectively, by integrated control controller 500.

In step S1000, integrated control controller 500 determines whether or not steering device 210, driving device 230, braking device 240, and external recognition unit 300 are normal, and if any of them is abnormal, terminates computation without performing various controls since the autonomous driving and the advanced driver assistance may not be performed.

On the other hand, if steering device 210, driving device 230, braking device 240, and external recognition unit 300 are all normal, integrated control controller 500 proceeds to step S1100 and determines whether or not ruts are detected in front of vehicle 200.

When integrated control controller 500 detects ruts in front of vehicle 200, integrated control controller 500 proceeds to step S1200 and determines whether or not a snowdrift is detected in front of vehicle 200.

Then, if ruts are detected but no snowdrift is detected, in other words, if ruts exist but no snowdrift exists on a snow-covered road, integrated control controller 500 performs trajectory tracking control for causing vehicle 200 to travel along the target trajectory in step S1300.

Furthermore, integrated control controller 500 proceeds to step S1400, and performs control (control 1) when vehicle 200 travels on a rutted road surface.

Figure 10:
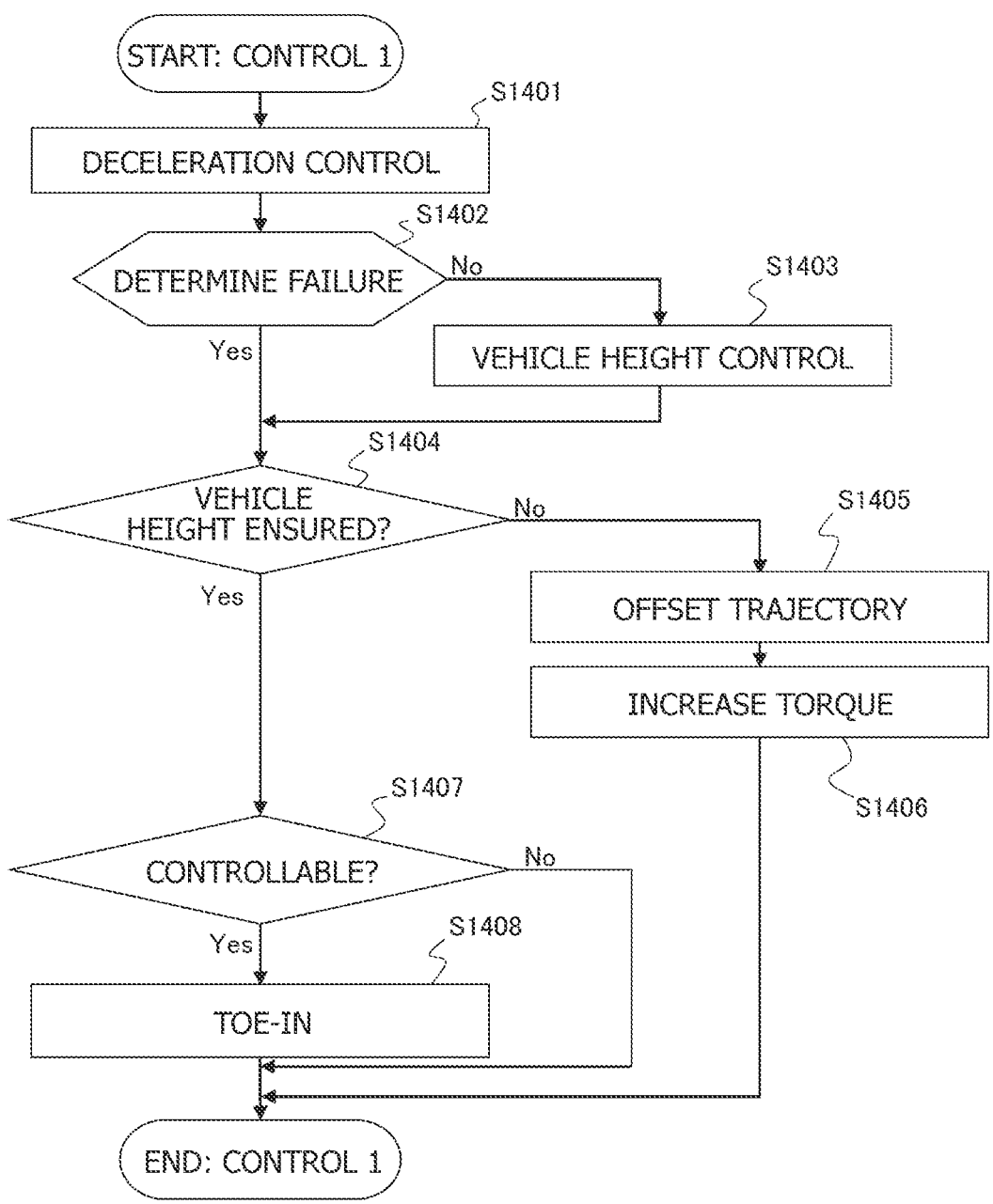
FIG. 10 is a flowchart illustrating control details when a vehicle travels in ruts.

The flowchart of FIG. 10 illustrates the details of processing contents (control 1) of step S1400.

In step S1401, before vehicle 200 encounters ruts, integrated control controller 500 performs driving and braking control for decelerating vehicle 200 to a predetermined appropriate vehicle speed that is suitable for traveling in ruts.

That is, in step S1401, integrated control controller 500 outputs a control command (third control command) to driving device 230 and/or braking device 240 to decelerate vehicle 200 to an appropriate vehicle speed for traveling in ruts (see FIG. 2).

Next, in step S1402, integrated control controller 500 determines whether or not suspension device 220 is normal.

If suspension device 220 is normal, integrated control controller 500 proceeds to step S1403 and performs control for adjusting the vehicle height so that the lower surface of vehicle 200 does not rub against snow when the wheels travel while being caught in ruts.

That is, when suspension device 220 is normal, integrated control controller 500 outputs a control command (first control command) to suspension device 220 to raise the vehicle height of vehicle 200 in step S1403 (see FIG. 2).

On the other hand, if abnormality occurs in suspension device 220, integrated control controller 500 bypasses step S1403 and proceeds to step S1404 so as to cancel adjusting the vehicle height.

In step S1404, integrated control controller 500 determines whether or not the vehicle height at which the lower surface of vehicle 200 does not rub against snow is ensured.

If the vehicle height required for traveling in ruts is ensured, integrated control controller 500 bypasses steps S1405 and S1406 and proceeds to step S1407 so that the wheels of vehicle 200 travel while being caught in ruts.

On the other hand, if the vehicle height required for traveling in ruts is not ensured, in other words, if the lower surface of vehicle 200 may rub against snow due to insufficient vehicle height, integrated control controller 500 proceeds to step S1405, and it sets so as to offset the target trajectory from the center of the ruts.

That is, when the wheels of vehicle 200 travel while being caught in ruts, the lower surface of vehicle 200 may rub against snow due to insufficient vehicle height. Thus, integrated control controller 500 corrects the target trajectory so that the wheels of vehicle 200 travel without being caught in ruts.

As a consequence of correcting the target trajectory, integrated control controller 500 outputs a steering angle command (second control command) to steering device 210 so that vehicle 200 traces the corrected target trajectory.

If the target trajectory is corrected in step S1405, vehicle 200 travels on a road surface with high track resistance on which no other vehicle has traveled before. Thus, integrated control controller 500 increases the drive torque in the next step S1406.

If the vehicle height required for traveling in ruts is ensured and vehicle 200 travels along ruts, integrated control controller 500 proceeds to step S1407 and determines whether steering device 210 is a steer-by-wire system that is capable of adjusting the toe angles of the right and left sides independently, and if so, integrated control controller 500 proceeds to step S1408.

In step S1408, in order to improve stability when the wheels travel while being caught in ruts, integrated control controller 500 outputs the toe-in control command (second control command) to steering device 210 so that the toe angle of the front wheels is directed more inwardly than when the wheels are not traveling in ruts (see FIG. 2).

On the other hand, if integrated control controller 500 detects a snowdrift in step S1200 in the flowchart in FIG. 9, that is, detects ruts and a snowdrift in front of vehicle 200, integrated control controller 500 proceeds to step S1500 and performs trajectory tracking control that causes vehicle 200 to travel along the target trajectory.

Furthermore, in the next step S1600, integrated control controller 500 performs control (control 2) for traveling on a snowy road on which ruts and snowdrifts exist.

Figure 11:
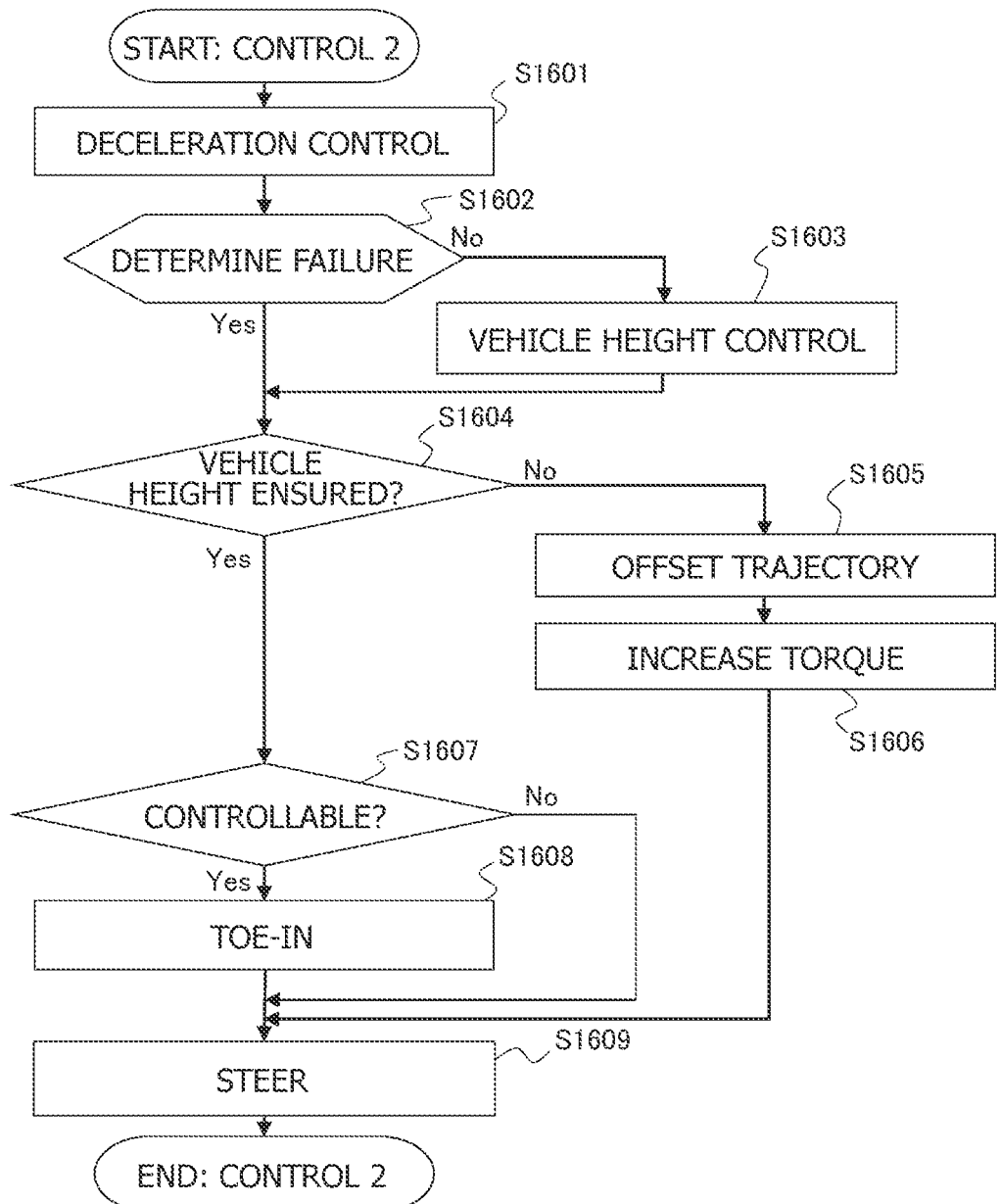
FIG. 11 is a flowchart illustrating control details when a vehicle travels in ruts and over a drift.

The flowchart of FIG. 11 illustrates the details of processing contents (control 2) of step S1600.

The respective processes in steps S1601 to S1608 in the flowchart of FIG. 11 are the same as those in steps S1401 to S1408 described above, and thus, are not described in further detail below.

Integrated control controller 500 performs deceleration control, vehicle height control, target trajectory correction control, and toe angle control in steps S1601 to S1608, and then proceeds to step S1609.

In step S1609, when vehicle 200 travels over a snowdrift, integrated control controller 500 outputs the steering angle control command (second control command) to steering device 210 so that a yaw moment is generated in a direction opposite to another yaw moment that is generated by track resistance caused by a snowdrift, and thereby offsets the other yaw moment that is generated by track resistance caused by the snowdrift (see FIG. 3).

Furthermore, if integrated control controller 500 does not detect ruts in front of vehicle 200 in step S1100 of the flowchart of FIG. 9, integrated control controller 500 proceeds to step S1700 and determines whether or not a snowdrift is detected.

If integrated control controller 500 detects a snowdrift in front of the vehicle, integrated control controller 500 proceeds to step S1800 to perform trajectory tracking control for causing vehicle 200 to travel along the target trajectory, and in the next step S1900, performs control (control 3) when vehicle 200 travels over the snowdrift.

Figure 12:
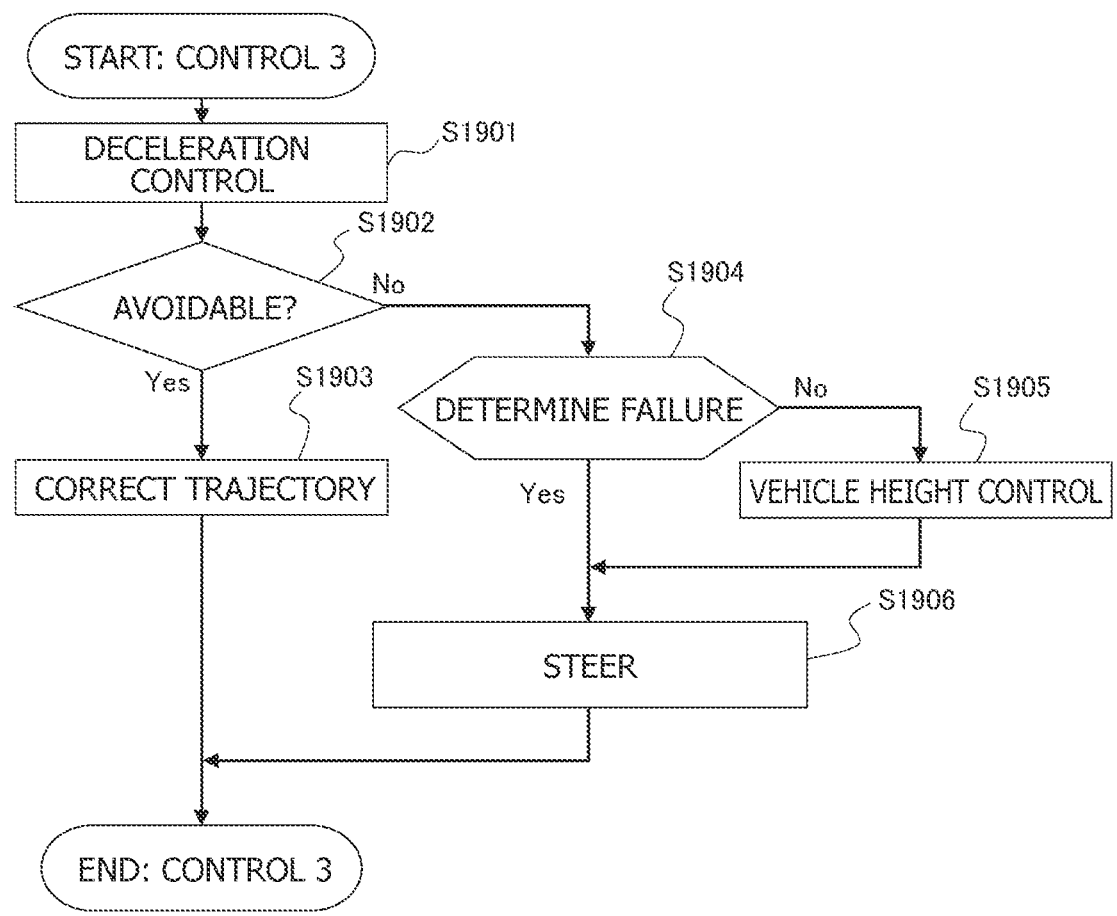
FIG. 12 is a flowchart illustrating control details when a vehicle travels over a drift.

The flowchart of FIG. 12 illustrates the details of processing contents (control 3) of step S1900.

In step S1901, before vehicle 200 encounters a snowdrift, integrated control controller 500 performs driving and braking control for decelerating vehicle 200 to a predetermined appropriate vehicle speed that is suitable for traveling over a snowdrift.

That is, in step S1901, integrated control controller 500 outputs a control command (third control command) to driving device 230 and/or braking device 240 to decelerate vehicle 200 to an appropriate vehicle speed for traveling over a snowdrift.

Next, integrated control controller 500 proceeds to step S1902 and determines whether or not vehicle 200 can travel while avoiding (bypassing) the snowdrift based on traveling conditions such as presence or absence of an oncoming vehicle and size and position of the snowdrift.

If the snowdrift is avoidable, integrated control controller 500 proceeds to step S1903, corrects the target trajectory of vehicle 200 (i.e., the target traveling locus) to a trajectory that avoids the snowdrift (see FIG. 4), and outputs the steering angle command (second control command) to steering device 210 so that vehicle 200 traces the corrected target trajectory.

On the other hand, if a snowdrift is unavoidable and the vehicle travels over the snowdrift, integrated control controller 500 proceeds to step S1904 and determines whether or not suspension device 220 is normal.

If suspension device 220 is normal, integrated control controller 500 proceeds to step S1905 and performs vehicle height control to raise the vehicle height of vehicle 200 higher than the vehicle height before vehicle 200 encounters the snowdrift, and thus improves travel stability (see FIG. 3).

That is, when vehicle 200 travels over a snowdrift, integrated control controller 500 outputs a vehicle height control command (first control command) to suspension device 220 so as to increase the vehicle height of vehicle 200.

On the other hand, when suspension device 220 is abnormal and the vehicle height may not be adjusted, integrated control controller 500 bypasses step S1905 and proceeds to step S1906 so as to cancel adjusting the vehicle height.

In step S1906, when vehicle 200 travels over a snowdrift, integrated control controller 500 outputs a steering angle control command (second control command) to steering device 210 so that a yaw moment is generated in a direction opposite to another yaw moment that is generated by track resistance caused by the snowdrift, and thereby offsets the other yaw moment that is generated by the track resistance caused by the snowdrift (see FIG. 3).

If integrated control controller 500 does not detect a snowdrift in front of vehicle 200 in step S1700 of the flowchart of FIG. 9, integrated control controller 500 proceeds to step S2000 and determines whether or not a pothole is detected.

Then, if integrated control controller 500 detects a pothole, integrated control controller 500 proceeds to step S2100 to perform trajectory tracking control for causing vehicle 200 to travel along the target trajectory.

Furthermore, in the next step S2200, integrated control controller 500 performs control (control 4) when vehicle 200 travels over a pothole.

Figure 13:
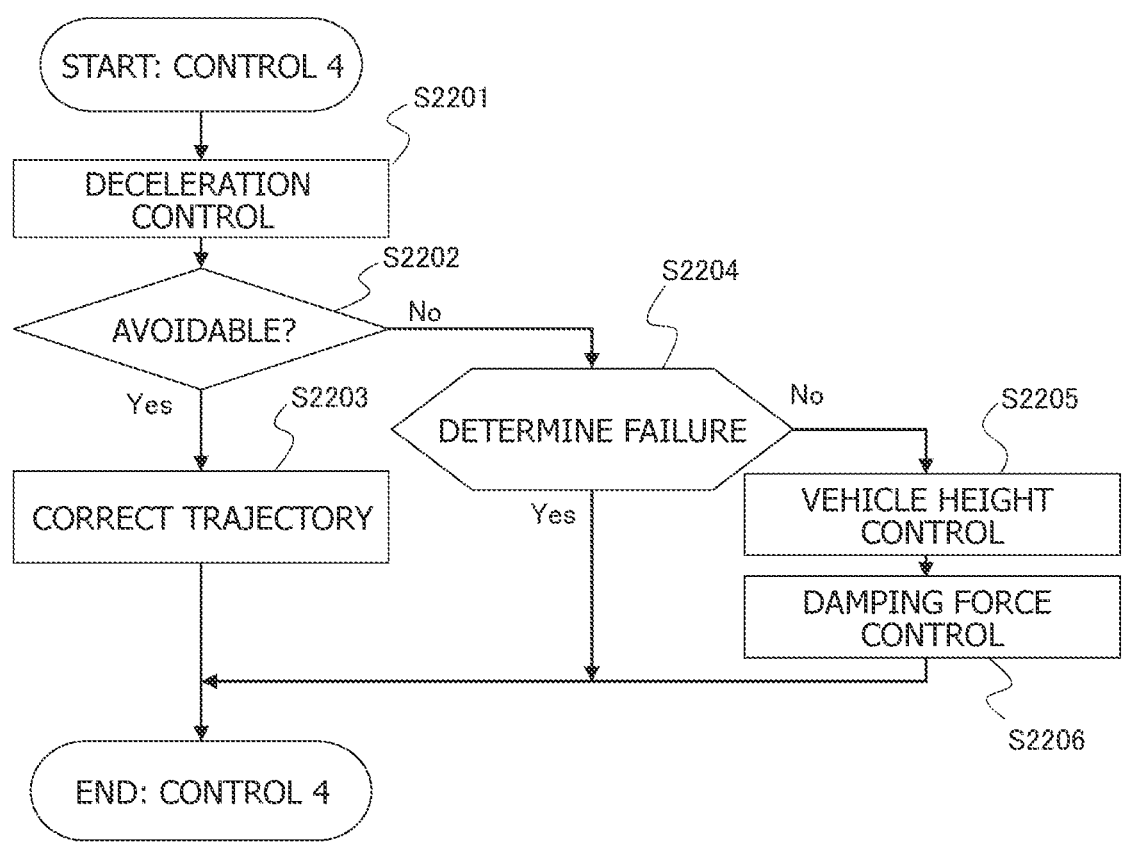
FIG. 13 is a flowchart illustrating control details when a vehicle travels over a pothole.

The flowchart of FIG. 13 illustrates the details of processing contents (control 4) of step S2200.

In step S2201, before vehicle 200 encounters a pothole, integrated control controller 500 performs driving and braking control for decelerating vehicle 200 to a predetermined appropriate vehicle speed that is suitable for driving in a pothole.

That is, in step S2201, integrated control controller 500 outputs the control command (third control command) for decelerating vehicle 200 to an appropriate vehicle speed for traveling in a pothole to driving device 230 and/or braking device 240.

Next, integrated control controller 500 proceeds to step S2202, and determines whether or not vehicle 200 can travel while avoiding (bypassing) a pothole based on travel conditions such as the presence or absence of an oncoming vehicle and size and position of a pothole.

If a pothole is avoidable, integrated control controller 500 proceeds to step S2203, corrects the target trajectory of vehicle 200 to a trajectory that avoids the pothole (see FIG. 5), and outputs the steering angle command (second control command) to steering device 210 so that vehicle 200 traces the corrected target trajectory.

On the other hand, if a pothole is unavoidable and the vehicle needs to travel over the pothole, integrated control controller 500 proceeds to step S2204 and determines whether or not suspension device 220 is normal.

If suspension device 220 is normal, integrated control controller 500 proceeds to step S2205 and performs vehicle height control to lift the wheels that encounter the pothole (see FIG. 5).

Furthermore, in the next step S2206, integrated control controller 500 performs damping force control for stiffening the damper of the wheels that encounter the pothole, in other words, increasing the damping force (see FIG. 5).

Note that if suspension device 220 is the fully active suspension in which suspension device 220 may adjust the vehicle height, integrated control controller 500 may perform either vehicle height control in step S2205 or damping force control in step S2206.

Furthermore, if suspension device 220 is a semi-active suspension in which the vehicle height may not be adjusted, but the damping force may be adjusted, integrated control controller 500 may cancel the process of step S2205 and perform step S2206.

Thus, when vehicle 200 travels over a pothole, integrated control controller 500 outputs the control command (first control command) to suspension device 220 to prevent the wheel from falling into the pothole, and thus, improves stability when vehicle 200 travels over the pothole.

If integrated control controller 500 does not detect a pothole in front of vehicle 200 in step S2000 of the flowchart of FIG. 9, integrated control controller 500 proceeds to step S2300 and determines whether or not a bump is detected.

If integrated control controller 500 detects a bump, integrated control controller 500 proceeds to step S2400 to perform trajectory tracking control for causing vehicle 200 to travel along the target trajectory.

Furthermore, in the next step S2500, integrated control controller 500 performs control (control 5) when vehicle 200 travels over the bump.

Figure 14:
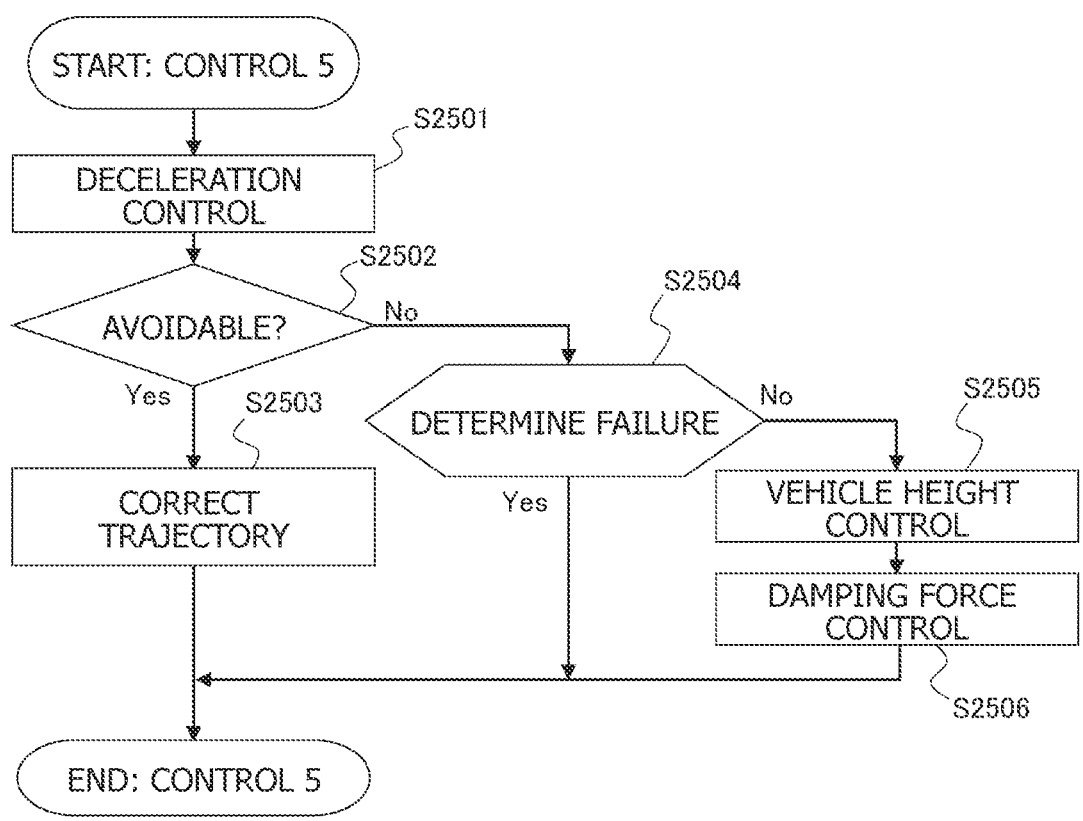
FIG. 14 is a flowchart illustrating control details when a vehicle travels over a bump.

The flowchart of FIG. 14 illustrates the details of processing contents (control 5) of step S2500.

In step S2501, before vehicle 200 encounters the bump, integrated control controller 500 performs driving and braking control to decelerate vehicle 200 to a predetermined appropriate vehicle speed that is suitable for travel over a bump.

That is, in step S2501, integrated control controller 500 outputs the control command (third control command) for decelerating vehicle 200 to an appropriate vehicle speed for travel over a bump to driving device 230 and/or braking device 240.

Next, integrated control controller 500 proceeds to step S2502, and determines whether or not vehicle 200 may travel while avoiding (bypassing) the bump based on travel conditions, such as presence or absence of an oncoming vehicle and the size and position of the bump.

If the bump is avoidable, integrated control controller 500 proceeds to step S2503, corrects the target trajectory of vehicle 200 to a trajectory that avoids the bump (see FIG. 6), and outputs the steering angle command (second control command) to steering device 210 so that vehicle 200 traces the corrected target trajectory.

On the other hand, if the bump is unavoidable and the vehicle needs to travel over the bump, integrated control controller 500 proceeds to step S2504 and determines whether or not suspension device 220 is normal.

If suspension device 220 is normal, integrated control controller 500 proceeds to step S2505 and performs vehicle height control to lift the wheels that encounter the bump (see FIG. 6).

Furthermore, in the next step S2506, integrated control controller 500 performs damping force control for softening the damper of the wheels that encounter the bump in other words, reducing the damping force (see FIG. 6).

Note that if suspension device 220 is a fully active suspension in which suspension device 220 may adjust the vehicle height, integrated control controller 500 may perform either vehicle height control in step S2505 or damping force control in step S2506.

Furthermore, if suspension device 220 is a semi-active suspension in which the vehicle height may not be adjusted, but the damping force may be adjusted, integrated control controller 500 may cancel the process of step S2505 and perform step S2506.

Thus, when vehicle 200 travels over the bump, integrated control controller 500 outputs the control command (first control command) to suspension device 220 to prevent the transmission of impact to the vehicle body, and thus, improves stability when vehicle 200 travels over the bump.

If integrated control controller 500 does not detect a bump in front of vehicle 200 in step S2300 of the flowchart of FIG. 9, integrated control controller 500 proceeds to step S2600 and determines whether or not a curved road is detected.

If integrated control controller 500 detects a curved road, integrated control controller 500 proceeds to step S2700 to perform trajectory tracking control for causing vehicle 200 to travel along the target trajectory.

Furthermore, in the next step S2800, integrated control controller 500 performs control (control 6) when vehicle 200 travels on a curved road.

Figure 15:
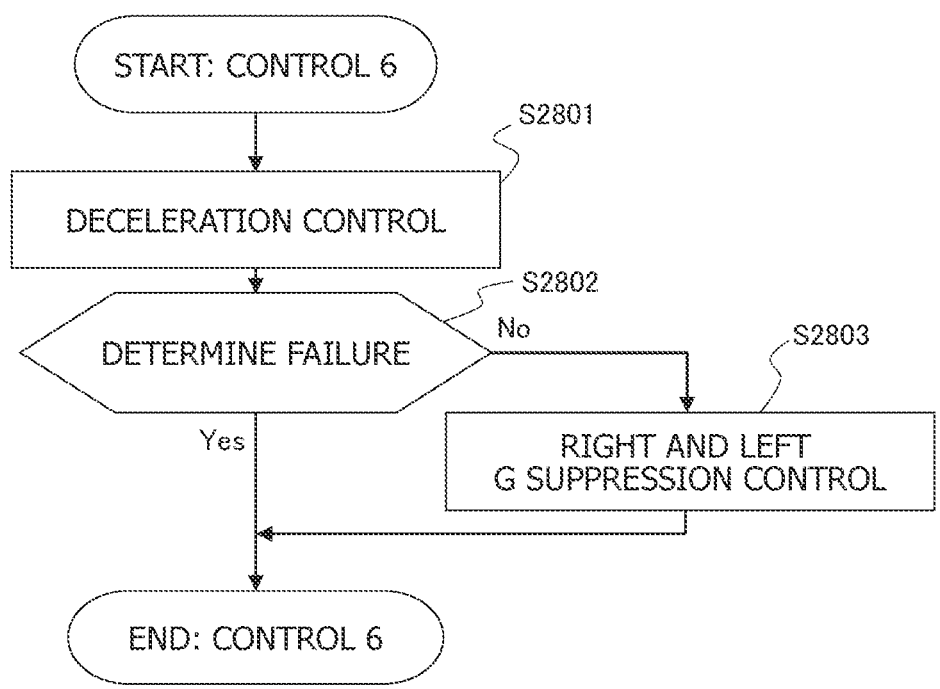
FIG. 15 is a flowchart illustrating control details when a vehicle travels on a curved road.

The flowchart of FIG. 15 illustrates the details of processing contents (control 6) of step S2800.

In step S2801, before vehicle 200 encounters a curved road, integrated control controller 500 performs driving and braking control to decelerate vehicle 200 to a predetermined appropriate vehicle speed that is suitable for traveling on a curve (turning traveling) (see FIG. 7).

That is, in step S2801, integrated control controller 500 outputs the control command (third control command) to decelerate vehicle 200 to an appropriate vehicle speed for traveling on the curved road to driving device 230 and/or braking device 240.

Next, integrated control controller 500 proceeds to step S2802 and determines whether or not suspension device 220 is normal.

If suspension device 220 is normal, integrated control controller 500 proceeds to step S2803 and performs vehicle height control to suppress the transverse acceleration (lateral acceleration) that is felt by the driver (occupant) when vehicle 200 travels on a curved road.

That is, in step S2803, integrated control controller 500 outputs the vehicle height adjustment control command (first control command) to suspension device 220 so that the vehicle height on the turning inner side becomes lower than the vehicle height on the turning outer side on the curved road, and thus, suppresses the lateral acceleration that is felt by the occupant of vehicle 200 during traveling on a curved road (see FIG. 7).

Here, integrated control controller 500 may predict the lateral acceleration that is generated during the traveling on a curve and adjust the difference in the vehicle heights of the turning inner and outer wheels based on the prediction result.

Furthermore, if integrated control controller 500 does not detect a curved road (road curvature) in front of vehicle 200 in step S2600 of the flowchart of FIG. 9, that is, if integrated control controller 500 does not detect any ruts, snowdrift, pothole, bump, or curved road, and a flat and substantially straight road extends in front of vehicle 200, integrated control controller 500 proceeds to step S2900, and performs trajectory tracking control for causing vehicle 200 to travel along the target trajectory.

The technical ideas described in the above embodiments may be used in any appropriate combination as long as they do not conflict with each other.

Although the present invention is specifically described above with reference to a preferred embodiment, it is apparent to one skilled in the art that variations of the embodiment can be made based on the basic technical concept and the teachings of the present invention.

For example, when height of a snowdrift or bump is lower than a predetermined value, or when a depth of a pothole is shallower than a predetermined value or the size of a pothole is smaller than a predetermined value, integrated control controller 500 may cause vehicle 200 to travel without changing the target trajectory even though irregularity such as a snowdrift, bump, pothole, and the like, is avoidable.

Furthermore, even when vehicle 200 is adjustable to a sufficient vehicle height on a rutted road surface, the target trajectory of vehicle 200 may be offset transversely by a predetermined distance from the center of the ruts (center of the space between the right and left ruts).

Furthermore, integrated control controller 500 may change the target trajectory of vehicle 200 so that vehicle 200 travels over a section in which height of a snowdrift or a bump is lower than a predetermined value, or the section in which a depth or size of a pothole is shallower or smaller than a predetermined value.

Furthermore, depending on the height of a snowdrift or bump, or the depth of ruts or a pothole, integrated control controller 500 may change an appropriate vehicle speed that is targeted in the deceleration control before the vehicle encounters the irregularity.

Furthermore, depending on the depth or size of a pothole, or the height of a bump, integrated control controller 500 may change the adjustment margins of the lifting variables and damping force in the wheels lifting control and the damping force adjustment control when vehicle 200 travels over a pothole or a bump.

Furthermore, integrated control controller 500 may output the steering angle control command (second control command) to steering device 210 so that a yaw moment is generated in a direction opposite to another yaw moment that is generated when either the right or left wheels travels over a bump or a pothole.

Furthermore, when integrated control controller 500 detects a bump (for example, a speed bump or a speed cushion), that has been intentionally installed, in front of vehicle 200 to encourage the driver to decelerate, integrated control controller 500 may output a control command (first control command) to suspension device 220 so that the wheels that are going over the bump are lifted and/or the damping force of the dampers on wheels that are going over the bump is decreased.

Furthermore, the irregularity is not limited to ruts, snowdrifts, potholes, and bumps that are defined in the above embodiment as partial unevenness of the road surface on which vehicle control is performed.

For example, integrated control controller 500 may detect a fallen object of a predetermined height or less on a road, a plate that is placed on the road for road construction, or the like, as a protrusion as an irregularity. Integrated control controller 500 may then perform deceleration control before encountering such an irregularity, and when vehicle 200 goes over the irregularity, integrated control controller 500 may perform control on suspension device 220 to lift the wheels and/or to decrease the damping force, or may perform steering control to change the target trajectory to that for avoiding the protrusion.

REFERENCE SYMBOL LIST

100 Vehicle control system
200 Vehicle
210 Steering device
220 Suspension device
230 Driving device
240 Braking device
300 External recognition unit
500 Integrated control controller (vehicle control device, control unit)
510 State estimation unit
511 Road surface determination unit
512 Vehicle state variable estimation unit
513 Trajectory generation unit
520 Integrated control execution unit
530 Vehicle behavior control unit
540 Trajectory tracking control unit
550 Distribution control unit

The invention claimed is:

1. A vehicle control device comprising:
a control unit that obtains a control command for controlling a suspension device, a steering device, and a braking and driving device provided on a vehicle,
wherein the control unit is configured to
acquire characteristics of a road condition in front of the traveling vehicle based on external information that is acquired from an external recognition unit,
acquire vehicle behavior control variables for controlling the behavior of the vehicle based on estimated state variables of the vehicle that are obtained based on the characteristics of the road condition and control variables concerning speed of the vehicle based on the external information,
acquire trajectory tracking control variables for causing the vehicle to track the target trajectory based on the target trajectory on which the vehicle travels that are obtained based on the characteristics of the road condition and the estimated state variables, and
output a first control command for controlling the suspension device, a second control command for controlling the steering device, and a third control command for controlling the braking and driving device based on the vehicle behavior control variables and the trajectory tracking control variables,
when characteristics of a snowdrift among the characteristics of the road condition are acquired,
the control unit outputs the third control command so that the vehicle decelerates before the vehicle encounters the snowdrift, and
when the vehicle travels over the snowdrift, the control unit outputs the second control command so that a yaw moment is generated in a direction opposite to another yaw moment that is generated by track resistance caused by the snowdrift.

2. A vehicle control method for obtaining a control command for controlling a suspension device, a steering device, and a braking and driving device that are provided on a vehicle, the method comprising the steps of:
acquiring characteristics of a road condition in front of the traveling vehicle based on external information that is acquired from an external recognition unit;
acquiring vehicle behavior control variables for controlling the behavior of the vehicle based on estimated state variables of the vehicle that are obtained based on the characteristics of the road condition and control variables concerning speed of the vehicle based on the external information;
acquiring trajectory tracking control variables for causing the vehicle to track the target trajectory based on the target trajectory on which the vehicle travels that are obtained based on the characteristics of the road condition and the estimated state variables; and
outputting a first control command for controlling the suspension device, a second control command for controlling the steering device, and a third control command for controlling the braking and driving device based on the vehicle behavior control variables and the trajectory tracking control variables,
when characteristics of a snowdrift among the characteristics of the road condition are acquired,
outputting the third control command so that the vehicle decelerates before the vehicle encounters the snowdrift, and
when the vehicle travels over the snowdrift, outputting the second control command so that a yaw moment is generated in a direction opposite to another yaw moment that is generated by track resistance caused by the snowdrift.

3. A vehicle control system comprising:
a suspension device provided on a vehicle;
a steering device provided on the vehicle;
a braking and driving device provided on the vehicle;
an external recognition device that acquires external information of the vehicle, and
a controller that obtains a control command for controlling the suspension device, the steering device, and the braking and driving device,
wherein the controller
acquires characteristics of a road condition in front of the traveling vehicle based on external information that is acquired from the external recognition device,
acquires vehicle behavior control variables for controlling the behavior of the vehicle based on estimated state variables of the vehicle that are obtained based on the characteristics of the road condition and control variables concerning speed of the vehicle based on the external information,
acquires trajectory tracking control variables for causing the vehicle to track the target trajectory based on the target trajectory on which the vehicle travels that are obtained based on characteristics of the road condition and the estimated state variables, and
outputs a first control command for controlling the suspension device, a second control command for controlling the steering device, and a third control command for controlling the braking and driving device based on the vehicle behavior control variables and the trajectory tracking control variables,
when characteristics of a snowdrift among the characteristics of the road condition are acquired,
the controller outputs the third control command so that the vehicle decelerates before the vehicle encounters the snowdrift, and
when the vehicle travels over the snowdrift, the controller outputs the second control command so that a yaw moment is generated in a direction opposite to another yaw moment that is generated by track resistance caused by the snowdrift.

* * * * *